(12) United States Patent
Zhao (10) Patent No.: US 8,977,122 B2
(45) Date of Patent: Mar. 10, 2015

(54) ROUTE SEARCH AND WAVELENGTH ALLOCATION METHOD IN OPTICAL NETWORK AND DEVICE THEREOF

(75) Inventor: Wei Zhao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 247 days.

(21) Appl. No.: 13/393,645

(22) PCT Filed: May 27, 2010

(86) PCT No.: PCT/CN2010/073315
§ 371 (c)(1),
(2), (4) Date: Mar. 1, 2012

(87) PCT Pub. No.: WO2011/026359
PCT Pub. Date: Mar. 10, 2011

(65) Prior Publication Data
US 2012/0163814 A1    Jun. 28, 2012

(30) Foreign Application Priority Data
Sep. 2, 2009  (CN) .......................... 2009 1 0090675

(51) Int. Cl.
*H04J 14/00* (2006.01)
*H04J 14/02* (2006.01)
*H04L 12/721* (2013.01)

(52) U.S. Cl.
CPC ......... *H04J 14/0257* (2013.01); *H04J 14/0212* (2013.01); *H04J 14/0267* (2013.01); *H04J 14/0268* (2013.01); *H04J 14/0293* (2013.01); *H04L 45/62* (2013.01); *H04J 14/0271* (2013.01)
USPC .............................................. 398/49; 398/48

(58) Field of Classification Search
CPC combination set(s) only.
See application file for complete search history.

(56) References Cited

U.S. PATENT DOCUMENTS

2002/0186432 A1*  12/2002  Roorda et al. ................. 359/128
2003/0011844 A1*   1/2003  Park et al. ..................... 359/128

(Continued)

FOREIGN PATENT DOCUMENTS

CN        101640817 A     2/2010
DE    102006030293 A1     8/2007

(Continued)

OTHER PUBLICATIONS

International Search Report for PCT/CN2010/073315 dated Aug. 27, 2010.

*Primary Examiner* — Shi K Li
*Assistant Examiner* — Mina Shalaby
(74) *Attorney, Agent, or Firm* — Ling Wu; Stephen Yang; Ling and Yang Intellectual Property (57) ABSTRACT

The present invention provides a method and device for routing and wavelength assignment in an optical network. The method comprises: a topology step in which a topology network of the optical network is obtained; a route calculation step in which at least one route in the topology network is calculated, a first node and a last node of the route being predetermined, and the at least one route being part of all routes from the first node to the last node; and a wavelength assignment determination step in which for each node on the route, it is determined whether link attribute information of the node meets a predetermined constraint condition, if the predetermined constraint condition is met, the route is selected as a working route, and the method ends; if the predetermined constraint condition is not met, the method returns to the route calculation step.

10 Claims, 8 Drawing Sheets

(56) References Cited

U.S. PATENT DOCUMENTS

| | | | |
|---|---|---|---|
| 2003/0020977 A1* | 1/2003 | Smith et al. | 359/110 |
| 2007/0147255 A1* | 6/2007 | Oyman | 370/238 |
| 2009/0087180 A1* | 4/2009 | Allen | 398/45 |
| 2010/0028006 A1* | 2/2010 | Guy et al. | 398/79 |

FOREIGN PATENT DOCUMENTS

| | | |
|---|---|---|
| JP | 2002368744 A | 12/2002 |
| JP | 2005223522 A | 8/2005 |
| JP | 2007274249 A | 10/2007 |
| KR | 20060023370 A | 3/2006 |

* cited by examiner

ROUTE SEARCH AND WAVELENGTH ALLOCATION METHOD IN OPTICAL NETWORK AND DEVICE THEREOF

TECHNICAL FIELD

The present invention relates to optical network technology, and more especially, to a method and device for routing and wavelength assignment in an optical network.

BACKGROUND OF THE RELATED ART

With the rapid increase of Internet traffic, the wavelength division multiplexing (WDM) transport network has gradually been widely used. Typically, the following technologies are used in the optical network: 1) optical add-drop multiplexing (OADM), in which a given wavelength can be inserted into or removed from an optical fiber; 2) wavelength routing, in which the wavelength of an input optical fiber can be routed to an output optical fiber; 3) wavelength conversion, in which a wavelength can be converted to another wavelength, and the existence or non-existence of wavelength conversion capability will affect the solution to routing and wavelength assignment (RWA); 4) optical switching, in which wavelength switching from one optical fiber to another can be implemented. The aforementioned technologies enable the transport network to provide more flexible functionalities.

Currently, functions of a switching matrix are limited and an optical transponder does not support full conversion of all optical wavelengths, thus when an optical link is assigned and an optical path is established, wavelength continuity limitations which cause potential congestion problems are still required to be considered. The RWA can be divided into centralized RWA and distributed RWA, important difference between which is that in the centralized RWA, each node in a network is aware of wavelength resource information of all nodes in the whole network, and the wavelength assignment algorithm is only performed in a source node. The RWA can be divided into two processes: Routing (R) and wavelength assignment (WA). In the R process, route calculation with constraint conditions, including uplink and downlink constraint conditions of a first node and a last node, optical fiber connectivity within a node, node wavelength resources, etc., are performed. The WA process is responsible for assigning wavelength resources to the calculated routes to establish an optical path (service tunnel). In the centralized RWA process, for a topology network shown in FIG. 3, in order to find a working route between node 1 and node 4, K=4 routes, 1-2-4, 1-2-5-4, 1-3-2-4 and 1-3-2-5-4, are firstly calculated in the R process, there being a number of nodes on each route; and secondly, wavelength assignment (WA) is performed, including determining availability or unavailability of the routes, and connectivity within the nodes. For example, there are 80 waves in each entrance and exit interface on the route 1-2-4: 1->2 (80 waves), 2->1 (80 waved), 2->4 (80 waves) and 4->2 (80 waves), and a wave that is not occupied by all nodes on the route is selected from these waves. This process specifically comprises the following steps. In step 101, an optical network is established, connections between fibers within the optical network are configured, and connections between fibers at first and last nodes (transmission interfaces) are configured. In step 102, a service tunnel from node 1 to node 4 is attempted to be established. In step 103, the K-shortest routing algorithm is performed to return K routes containing wavelength resource information, wherein a recursive algorithm is used to calculate the routes, and K is set to be 2. If two returned routes are 1->2->4 and 1->2->5->4 respectively, the process proceeds to step 104; and if it can be determined that the routes have not been found and there are no remaining routes, the process directly proceeds to step 106. In step 104, it is determined whether wavelength assignment is performed for each route, if the route is determined to be unavailable, the process returns to step 103, otherwise, the process proceeds to step 105. In step 105, the wavelength assignment is performed for all the found routes as working routes. In step 106, the process ends, and a prompt of query failure or a corresponding found working route is provided.

CONTENT OF THE INVENTION

In the process of implementing the present invention, it is found that at least the following problem exists in the prior art: usually two processes, routing (R) and wavelength assignment (WA), are separated and processed respectively such that the calculated route does not meet constraint conditions for wavelength assignment, that is, many route calculations may be required to be performed to find a working route required by the wavelength assignment.

An object of the present invention is to provide a method and device for routing and wavelength assignment in an optical network so as to integrate the routing and wavelength assignment into one process, thereby increasing the hit rate of wavelength assignment.

Therefore, the present invention provides a method for routing and wavelength assignment in an optical network comprising: a topology step in which a topology network of the optical network is obtained; a route calculation step in which at least one route in the topology network is calculated, a first node and a last node of the route being predetermined, and the at least one route being part of all routes from the first node to the last node; and a wavelength assignment determination step, in which for each node on the route, it is determined whether link attribute information of the node meets a predetermined constraint condition, if the predetermined constraint condition is met, the route is selected as a working route, and the method ends; if the predetermined constraint condition is not met, the method returns to the route calculation step.

In the method, the first node supports insertion of an optical signal with a preset wavelength into an optical fiber at the first node; and the last node supports removal of the optical signal with the preset wavelength from an optical fiber at the last node.

In the method, the wavelength assignment determination step also comprises: when the link attribute information of the node is determined to meet the predetermined constraint condition, converting an wavelength of an optical signal into the preset wavelength to meet the predetermined constraint condition; wherein the meeting the predetermined constraint condition means that the node has connectivity and is able to transmit the optical signal with the preset wavelength.

In the method, the wavelength assignment determination step also comprises: when the link attribute information of the node is determined to meet the predetermined constraint condition, performing optical path impairment validation on an optical fibers between the node and its adjacent node on the route.

In the method, the wavelength assignment determination step also comprises: after the route is selected as the working route, when the working route is determined to need a protection route, returning to the route calculation step to calculate a route; and for each node on the route, determining whether link attribute information of the node meets the predetermined constraint condition, if the predetermined constraint condition is met, selecting the route as the protection route, and ending the method; if the predetermined constraint condition is not met, returning to the route calculation step, wherein the meeting the predetermined constraint condition means that the node has connectivity and is able to transmit the optical signal with the preset wavelength.

In the method, in the route calculation step, a recursive algorithm is used to calculate the route.

The present invention further provides a device for routing and wavelength assignment in an optical network comprising: a routing control unit configured to obtain a topology network of the optical network, and calculate at least one route in the topology network, a first node and a last node of the route being predetermined, and the at least one route being part of all routes from the first node to the last node; and a working route determination unit configured to, for each node on the route, determine whether link attribute information of the node meets a predetermined constraint condition, and if the predetermined constraint condition is met, select the route as a working route; if the predetermined constraint condition is not met, continue to make the determination for another route calculated by the routing control unit.

In the device, the routing control unit also comprises a first and last node determination module configured to determine whether the first node supports insertion of an optical signal with a preset wavelength into an optical fiber at the first node, and determine whether the last node supports removal of the optical signal with the preset wavelength from an optical fiber at the last node.

In the device, the routing control unit also comprises: a wavelength conversion determination module configured to, when determining that the link attribute information of the node meets the predetermined constraint condition, convert a wavelength of an optical signal into the preset wavelength to meet the predetermined constraint condition; and an algorithm selection module configured to select a recursive algorithm to perform the route calculation.

The device also comprises: a protection route determination unit configured to, after the route is selected as a working route and when the working route is determined to need a protection route, notify the routing control unit to calculate a route, and for each node on the route, determine whether link attribute information of the node meets the predetermined constraint condition, if the predetermined constraint condition is met, select the route as the protection route to send to a connection controller; if the predetermined constraint condition is not met, notify the routing control unit to calculate another route, and make the determination for the route; and an optical path impairment validation module configured to, when the working route determination unit or the protection route determination unit determines that link attribute information of each node on a route meets the predetermined constraint condition, perform optical path impairment validation on an optical fiber between the node and its adjacent node on the route, and when the route is determined to be used as the working route or protection route, notify the working route determination unit or the protection route determination unit to select the route as the working route or the protection route, wherein the meeting the predetermined constraint condition means that the node has connectivity and is able to transmit the optical signal with the preset wavelength.

The present invention has the following beneficial effects: after a route that meets the predetermined constraint condition is calculated, whether the route meets the wavelength assignment is determined, instead of performing the wavelength assignment at one time after a plurality of routes are calculated, thus increasing the hit rate of the available routes, reducing information exchange between unit modules, and improving the stability of the system.

PREFERRED EMBODIMENTS OF THE PRESENT INVENTION

In order for the objects, technical features and implementation effects of the present invention to be understood more clearly, the technical scheme of the present invention will be described in detail in conjunction with the accompanying drawings and specific embodiments.

Internal fiber connectivity (resistive) in one node (usually a passing node on a route) means bi-directional connectivity between an entrance interface and an exit interface within the node. For a node that is required to pass by the route, if the entrance interface and the exit interface within the node do not have bi-directional connectivity, the route cannot be used. Operations in the following embodiments are performed at the first node, unless otherwise stated.

Figure 1:
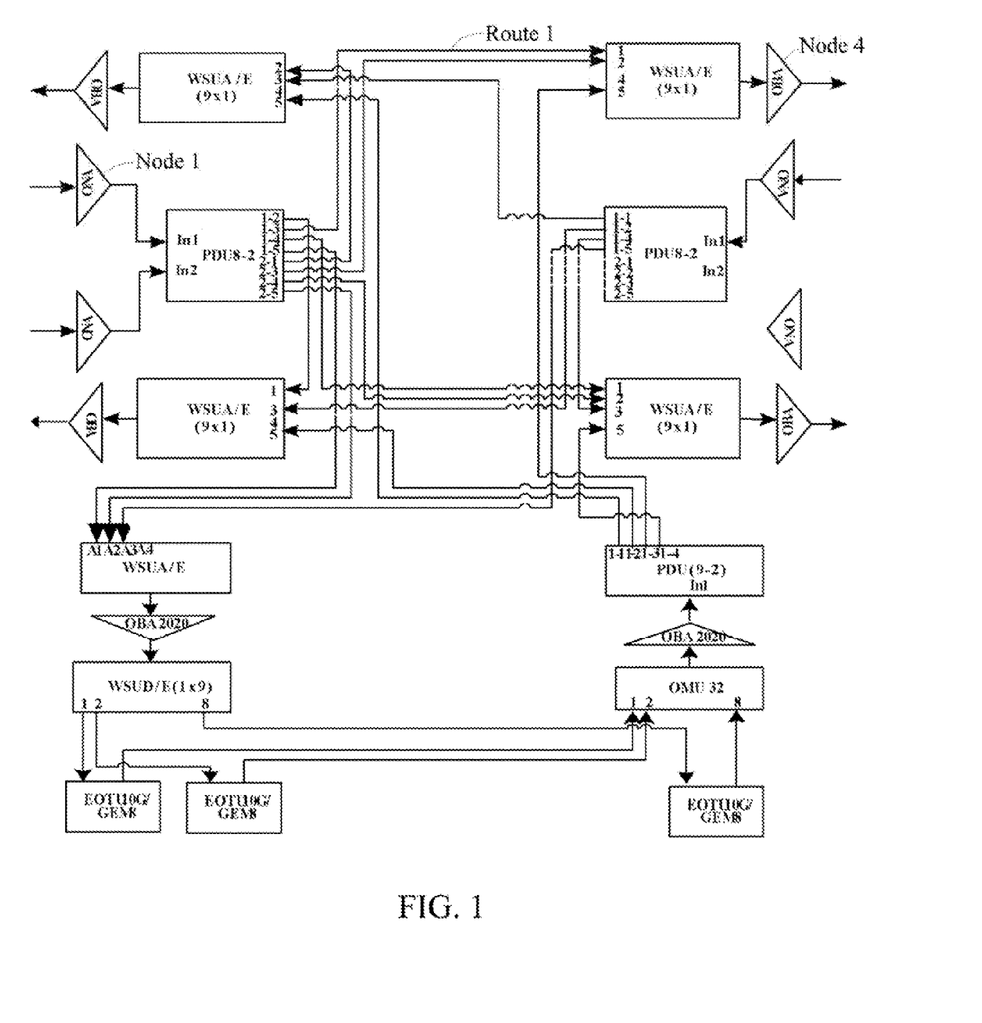
FIG. 1 is a structural diagram of nodes within a reconfigurable OADM system in accordance with an embodiment of the present invention.

As shown in FIG. 1, on the premise of without loss of generality, there are node 1 as a first node and node 4 as a last node, connectivity between node 1 and node 4 are implemented through route 1, in which pins 1-3 of PDU8-2 are included and pin 1 of WSUA/E is used as a node except the first or last nodes on route 1. However, in the optical network, when data is required to be sent from node 1 to node 4, it is not known in advance whether there exist available routes between node 1 and node 4, because whether the connectivity between node 1 and node 4 exits is dynamically variable, that is, node 1 might be disconnected from node 4 due to some changes. Therefore, in data transmission, each node between node 1 and node 4 is required to be detected to find a suitable working route.

Figure 2:
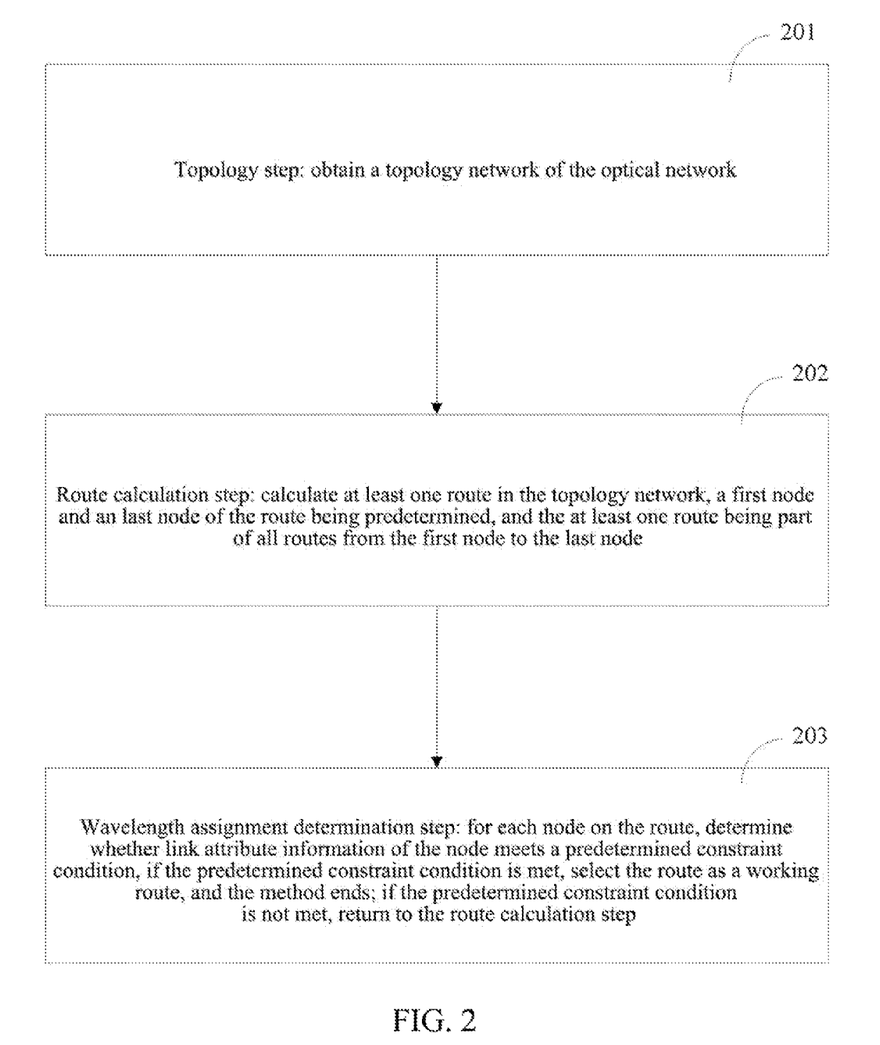
FIG. 2 is the first flow diagram of a method for routing and wavelength assignment in an optical network in accordance with an embodiment of the present invention.

In this embodiment, a method for routing and wavelength assignment in an optical network is provided and, as shown in FIG. 2, comprises the following steps.

In step 201, i.e., a topology step, a topology network of the optical network is obtained.

In step 202, i.e., a route calculation step, at least one route in the topology network is calculated, a first node and a last node of the route being predetermined, and the at least one route being part of all routes from the first node to the last node.

In step 203, i.e., a wavelength assignment determination step, for each node on the route, it is determined whether link attribute information of the node meets a predetermined constraint condition, if the predetermined constraint condition is met, the route is selected as a working route, and the method ends; if the predetermined constraint condition is not met, the method returns to the route calculation step.

In the technique scheme provided by the present invention, after at least one route that meets the predetermined constraint condition is calculated, whether the route meets the wavelength assignment is determined, instead of performing the wavelength assignment at one time after a plurality of routes are calculated, thus decreasing mass data generated by route calculation, increasing the hit rate of the available routes, reducing information exchange between modules, and improving the stability of the system.

Meeting the predetermined constraint condition means at least that the node has connectivity, and wavelength resource information of the node indicates that the node can transmit an optical signal with the preset wavelength.

The route is calculated by recursion, and the number of nodes on the route should be consistent with a preset number that is determined by a specific algorithm used by the recursion. For example, the traditional constrained shortest path first (CSPF) Dijkstra algorithm or the Bellman-Ford algorithm can be used as a recursive algorithm to calculate the route, and the number of nodes on the currently found route is consistent with the number of nodes on the last found route or greater than a natural number as small as possible.

If the node has wavelength conversion capability, step 203 also comprises, when wavelength resource information in link attribute information of each node on the route is determined not to meet the predetermined constraint condition, determining whether the predetermined constraint condition can be met after the wavelength conversion.

According to the technical scheme described above, an embodiment of the present invention provides a method for routing and wavelength assignment in an optical network based on wavelength resource information analysis. In an optical network, a) unlink and downlink constraint analysis of the first and last nodes, which means that wavelengths of optical signals inserted into an optical fiber at the first node and removed from the optical fiber at the last node are analyzed; b) K-shortest routing algorithm; c) node connectivity analysis of a passing node and wavelength resource information analysis, are required to be performed in this embodiment. In the wavelength resource information analysis analyzes, the wavelength resource information of each node on the route is analyzed. If all nodes on the route have available wavelengths and the uplink and downlink of the first node and the last node meet the constraint analysis, then this route is available.

Figure 4:
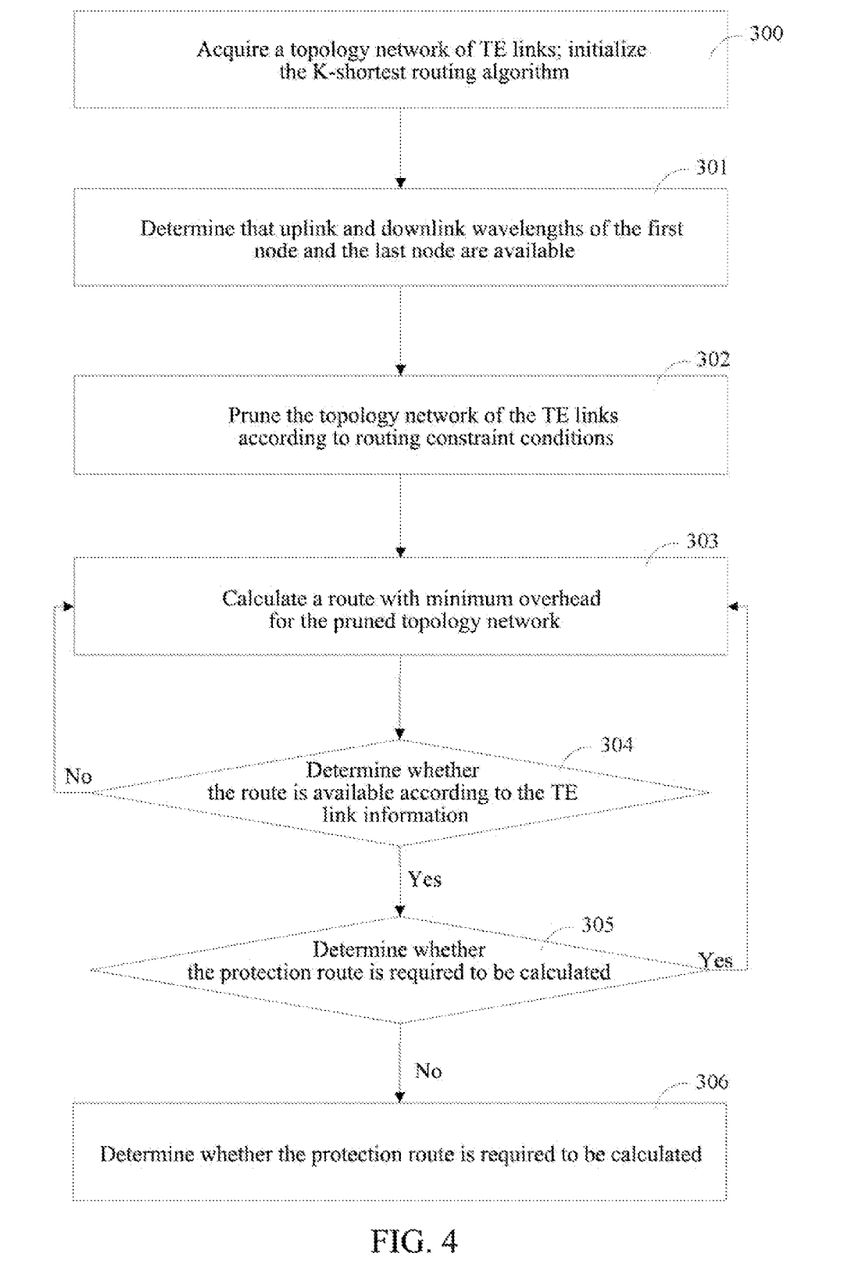
FIG. 4 is the second flow diagram of a method for routing and wavelength assignment in an optical network in accordance with an embodiment of the present invention.

According to the above description, functions of the node connectivity analysis and the wavelength resource information analysis are embedded into the K-shortest routing algorithm to verify that the found route meets the wavelength assignment (WA) determination condition while calculating a route (R) based on the predetermined constraint condition to use the route as a working route. As shown in FIG. 4, the method comprises the following steps.

In step 300, a topology network of traffic engineering (TE) links is acquired; and the K-shortest routing algorithm is initialized. TE link information is used to describe attributes of an optical path.

In step 301, uplink and downlink wavelengths of the first node and the last node are determined to be available, that is, the first node supports insertion of an optical signal with a preset wavelength into an optical fiber at the first node; and the last node supports removal of an optical signal with the preset wavelength from the optical fiber at the last node.

In step 302, according to routing constraint conditions, the topology network of the TE links is pruned. The constraint conditions include uplink and downlink constraint analysis of the first and last nodes; for non-wavelength conversion resistive optical network, wavelength resources of the node are likely occupied by other optical paths.

If each node has the wavelength conversion capability to convert one wavelength into another wavelength, then some nodes with insufficient conversion capability may be considered to be removed when the topology network is pruned.

The route constraint conditions include nodes that must be passed by and nodes that must be bypassed, and links that must be passed by and links that must be bypassed when optical signals are transmitted.

The pruning principle includes: in the case of a node that must be bypassed, the node is not allowed to appear on the route in the subsequent routing process, and in the case of a node that must be passed by, the node must appear on the route in the subsequent routing process.

In step 303, a route with the minimum overhead is calculated for the pruned topology network.

The minimum overhead means that the number of nodes on the route is minimum or the link cost of the route is minimum. Only one route is calculated in this step, then step 304 is performed, which, however, does not mean that only one route is allowed to be calculated.

The K-shortest routing branch algorithm is used to separate the topology network of the TE links from the last node to the first node in the last calculated routing direction to acquire the second-shortest routing, and the method proceeds to step 304.

Currently, a variety of selectable mature technologies is used for the K-shortest routing algorithm to find a plurality of routes. The K-shortest routing algorithm might be based on the traditional CSPF Bellman-Ford algorithm and Dijkstra algorithm. Except that the first nodes and the last nodes of these found routes are the same, other passing nodes may be different, and the exit interfaces of the first and last nodes might also be different. The K-shortest routing algorithm may also be suitable for 1+1 route calculation, that is, a working route and a protection route are calculated.

It should be noted that there should exist a constraint condition that the protection route is separated from the working route, that is, the working route and the protection route should be different paths. If the suitable route cannot be found, since the optical network is dynamically changed, the route may be calculated again after a few minutes, or the method may directly proceed to step 306.

In step 304, link attribute information of each node on the route with the minimum overhead is searched; whether the route is available is determined based on the TE link information, and if the route is available, the route is stored and the method proceeds to step 305; otherwise, the method returns to step 303.

It should be noted that if it is the working route that is currently processed, the route is stored as the working route; if it is the protection route that is currently processed, the route is stored as the protection route.

When the route with the minimum overhead is occupied exclusively for some reason, for example, if the route is occupied exclusively by an optical signal with higher priority from the military, a second shortest route might be selected and is regarded as the route with the minimum overhead at present. The TE link information includes optical fiber cross-connectivity within the node, wavelength resource information, etc.

In step 305, whether the protection route is required to be calculated is determined.

If the protection route is not required to be calculated, the method proceeds to step 306; if the protection route is required to be calculated, then the method returns to step 303.

In step 306, the method ends; and a prompt of search failure or the corresponding found route is given.

The technology provided in this embodiment achieves the object of calculating the route effectively based on the traditional CSPF routing algorithm and the WA algorithm. This embodiment uses the traditional CSPF Dijkstra routing algorithm and the WA algorithm, instead of separately modifying the algorithm for route calculation of optical transmission, which may be beneficial to ensure the generality of the CSPF Dijkstra algorithm and the WA algorithm, improve the module independence and provide good extensibility to the RWA algorithm in the resistive optical network.

Figure 3:
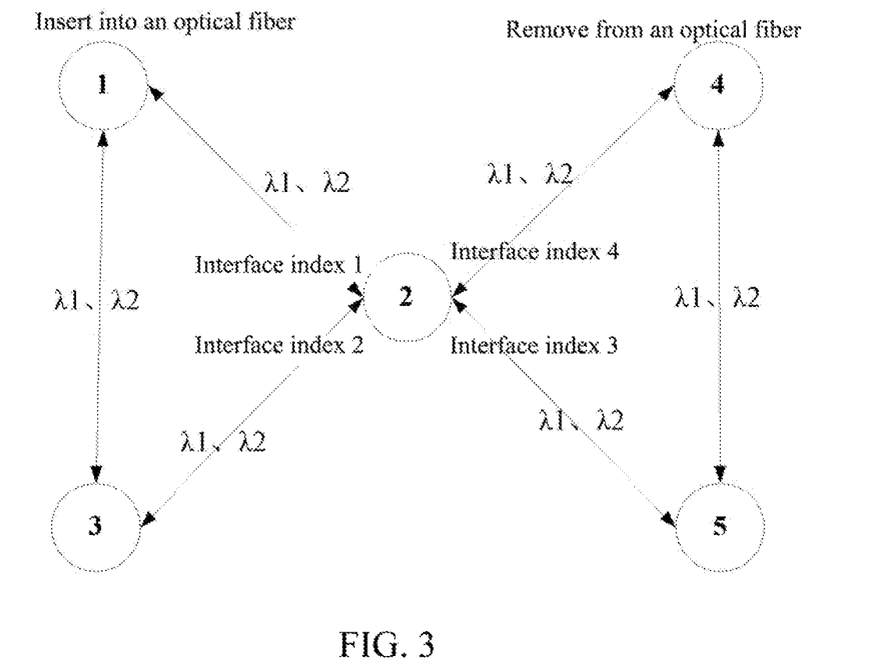
FIG. 3 is the first schematic diagram of a topology network of an optical network in accordance with an embodiment of the present invention.

Referring to the topology network of the TE links shown in FIG. 3, there is a plurality of nodes in the network, node 1 is used as the first node, and node 4 is used as the last node. When data is required to be transmitted from node 1 to node 4, it is not known whether there is a connected route between node 1 and node 4. Two wavelengths λ1 and λ2 indicate that the corresponding nodes support the transmission of optical signals with the two wavelengths. Services from node 1 to node 4 are established, and the process comprises the following steps.

In step 401, in the K-shortest routing algorithm, an available route of 1->2->4 is calculated.

In order to verify the connectivity, optical fibers between four interface indexes of intermediate node 2 are not all connected: that is, interface index 1 and interface index 3 within node 2 are not connected, and interface index 1 and interface index 4 are not connected. TE link interface wavelength resources are configured with two wavelengths (λ1 and λ2), weights of which are both 1. Each node is started separately.

A recursive method can be used to calculate the route to acquire a route of 1->2->4.

In step 402, wavelength assignment determination is made based on the TE link information, and the result is failure.

The TE link information includes optical fiber cross-connectivity within the node and wavelength resource information.

If the currently found K routes are all unavailable, then intermediate nodes other than the first and last nodes on the K routes are used as the loose exclusion conditions, that is, some or all of the intermediate nodes are determined as the intermediate nodes which certainly are not passed by; and the process proceeds to step 403.

In step 403, a branch route of 1->2->5->4 is found out and then the TE link information of each node is searched to make the wavelength assignment determination, and the result is failure.

In step 404, a route of 1->3->2->4 is calculated, and the TE link information is searched to make the wavelength assignment determination, and if the result is successful, this route is returned as a working route.

The wavelength assignment determination is made in the K-shortest routing algorithm to reduce information exchange between modules, to speed up establishment of a service tunnel, and to improve the system stability of the optical network.

Figure 5:
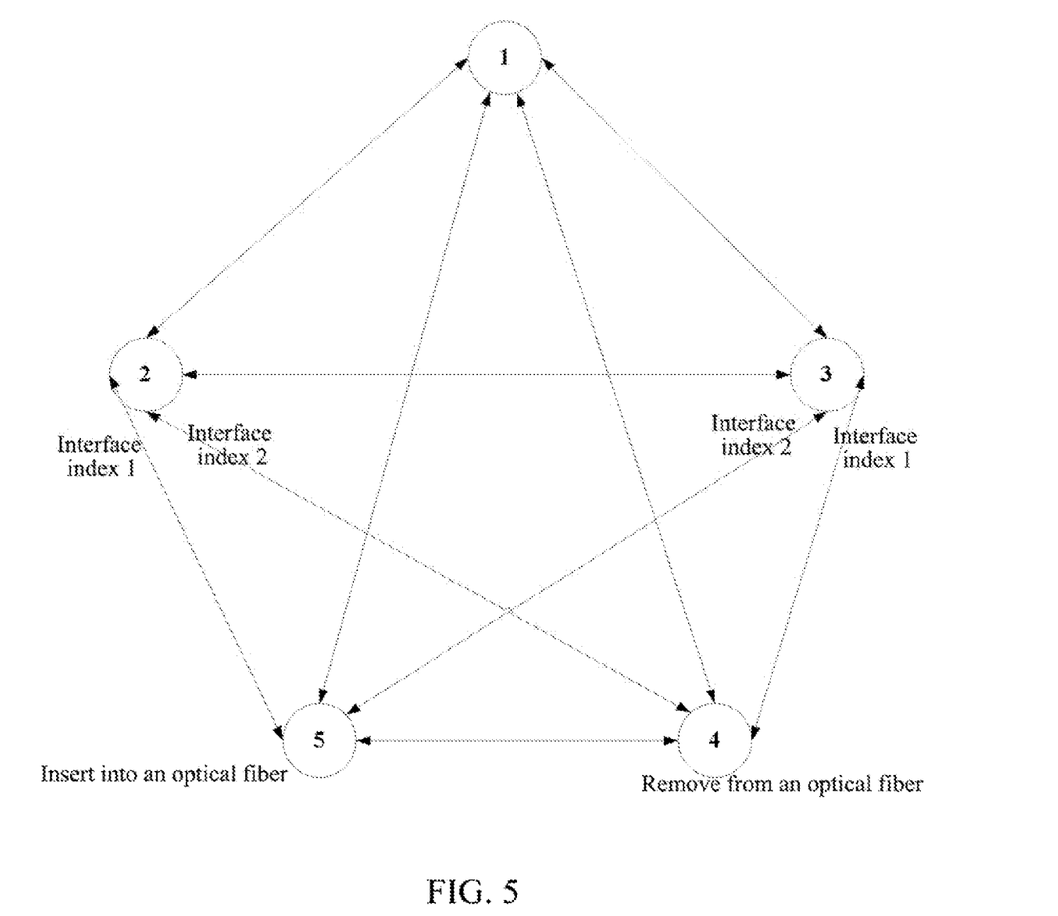
FIG. 5 is the second diagram of a topology network of an optical network in accordance with an embodiment of the present invention.

In this embodiment, the topology network shown in FIG. 5 may, on the premise of without loss of generality, be transformed from a specific optical network. A connection request is executed based on the optical network to establish a service tunnel from node 5 to node 4, and the process comprises the following steps.

In step 501, in the K-shortest routing algorithm, a route of 5->4 is first calculated, and TE link information is searched to make wavelength assignment determination, and if the result is failure, the reason might be that there are no wavelength resources.

The TE link information includes optical fiber cross-connectivity within the node, wavelength resource information, etc.

In step 502, the K-shortest branch route of 5->1->4 is calculated, and then the TE link information is searched to make the wavelength assignment determination, and if the result is failure, the reason might be that the internal connectivity is not met.

In step 503, the recursive calculation is continued, a route of 5->2->4 is calculated, and the TE link information is searched to make the wavelength assignment determination, and if the result is successful, then this route is returned as a working route.

In the embodiment described above, there are relatively few nodes in the provided topology network, but in practice, there are may be dozens or even hundreds or thousands of nodes. If the suitable working route and protection route are found after all possible routes are calculated, then mass data may be generated, thus using the technology provided in the embodiment of the present invention can greatly reduce the computation amount.

When the link attribute information of the node is determined to meet the predetermined constraint condition, optical path Impairment Validation (IV) is further performed on an optical fiber between the node and its adjacent node. After the embodiment described above is modified, as shown in FIG. 6, the method comprises the following steps.

Figure 6:
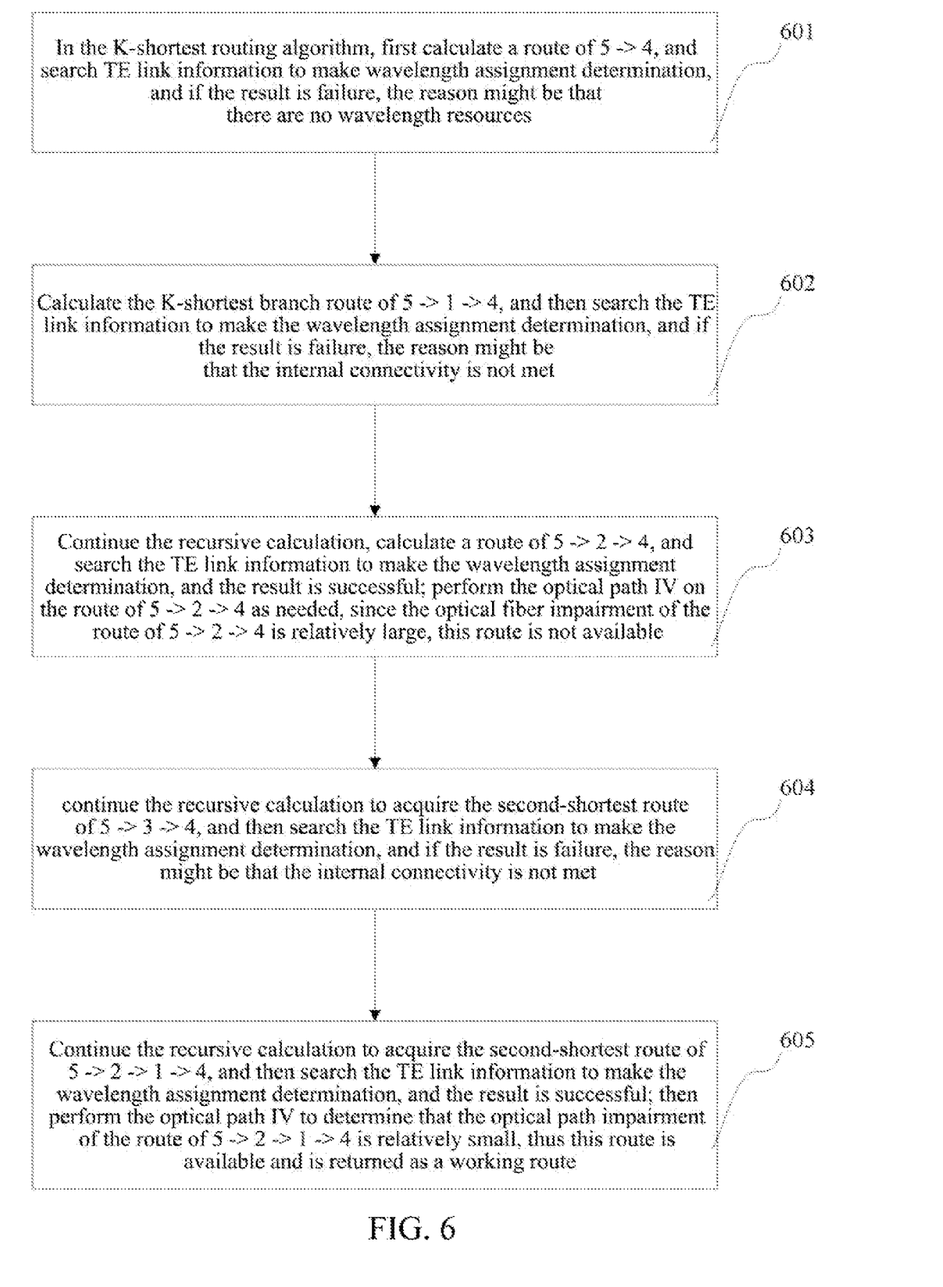
FIG. 6 is a flow diagram of a process of routing, wavelength assignment and optical path impairment validation in accordance with an embodiment of the present invention.

In step 601, in the K-shortest routing algorithm, a route of 5->4 is first calculated, and TE link information is searched to make wavelength assignment determination, and if the result is failure, the reason might be that there are no wavelength resources.

The TE link information includes optical fiber cross-connectivity within the node, wavelength resource information, etc.

In step 602, the K-shortest branch route of 5->1->4 is calculated, and then the TE link information is searched to make the wavelength assignment determination, and if the result is failure, the reason might be that the internal connectivity is not met.

In step 603, the recursive calculation is continued, a route of 5->2->4 is calculated, and the TE link information is searched to make the wavelength assignment determination, and the result is successful; the optical path IV is performed on the route of 5->2->4 as needed, and it can be seen from the calculation that the optical fiber impairment of the route of 5->2->4 is relatively large, thus this route is not available; the method proceeds to step 604.

The optical path impairment might occur in a node or an optical fiber between two nodes.

In step 604, the recursive calculation is continued to acquire the second-shortest route of 5->3->4, and then the TE link information is searched to make the wavelength assignment determination, and if the result is failure, the reason might be that the internal connectivity is not met.

In step 605, the recursive calculation is continued to acquire the second-shortest route of 5 ->2->1->4, and then the TE link information is searched to make the wavelength assignment determination, and the result is successful.

Then the optical path IV is performed to determine that the optical path impairment of the route of 5->2->1->4 is relatively small, thus this route is available and is returned as a working route.

In the processing of the optical path IV, for example, it is determined whether the cumulative value of loss due to optical path impairment of all optical fibers and nodes on the route is less than a preset value. Therefore, on a calculated route (such as the route of 5->2->1->4), the optical path impairment validation is performed from the first node (node 5) to the last node (node 4).

Specifically, the optical fiber type, wavelength, optical transmitter and receiver, optical wave converged device and optical wave separator may be detected and validated and specific parameters may be one or more of: a. CD, b. OSNR, c. power, and d. PMD.

Whether the route is available is determined based on the calculation result of each parameter of the optical path IV.

In the technical scheme described above, a series of algorithm processing such as the wavelength assignment (WA) and optical path impairment validation are performed in the Routing (R) process. If the preset condition is met, one or more routes and wavelength resource assignment information for these routes are returned.

Figure 7:
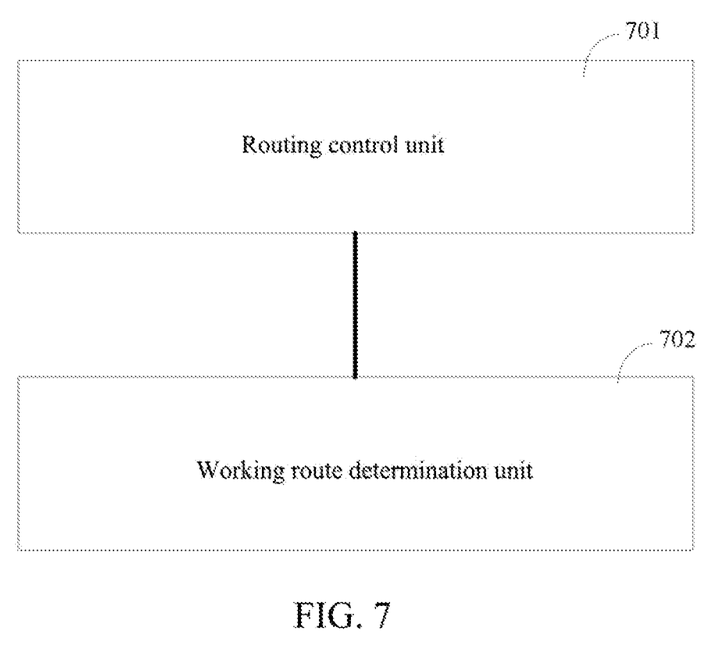
FIG. 7 is the first block diagram of a device for routing and wavelength assignment in an optical network in accordance with an embodiment of the present invention.

Corresponding to the method, the embodiment of the present invention also provides a device for routing and wavelength assignment in an optical network, which, as shown in FIG. 7, comprises:

a routing control unit 701 configured to obtain a topology network of the optical network, and calculate at least one route in the topology network, a first node and a last node of the route being predetermined, and the at least one route being part of all routes from the first node to the last node; and a working route determination unit 702 configured to, for each node on the route, determine whether link attribute information of the node meets a predetermined constraint condition, and if the predetermined constraint condition is met, select the route as a working route; if the predetermined constraint condition is not met, continue to make the determination for another route calculated by the routing control unit.

This embodiment has the following beneficial effects: after at least one route that meets the predetermined constraint condition is calculated, whether the route meets the wavelength assignment is determined, instead of performing the wavelength assignment at one time after a plurality of routes are calculated, thus increasing the hit rate of the available routes, reducing information exchange between the routing control module 701 and other unit modules, and improving the stability of the system.

Figure 8:
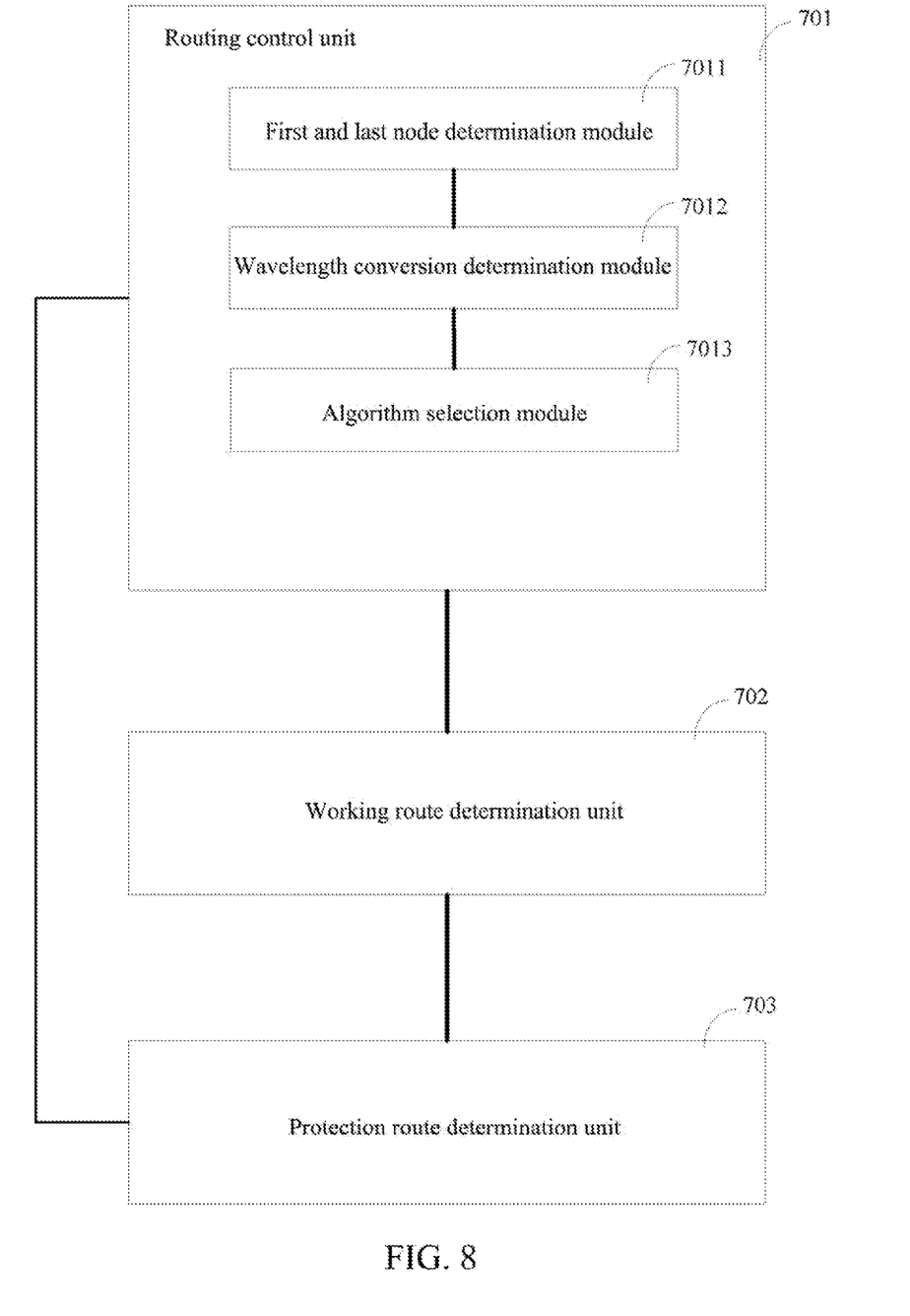
FIG. 8 is the second block diagram of a device for routing and wavelength assignment in an optical network in accordance with an embodiment of the present invention.

As shown in FIG. 8, the routing control unit 701 also comprises:

A first and last node determination module 7011 configured to determine whether the first node supports insertion of an optical signal with a preset wavelength into an optical fiber at the first node, and determine whether the last node supports removal of the optical signal with the preset wavelength from an optical fiber at the last node;

a wavelength conversion determination module 7012 configured to, when determining that the link attribute information of the node meets the predetermined constraint condition, convert a wavelength of an optical signal into the preset wavelength to meet the predetermined constraint condition; and an algorithm selection module 7013 configured to select a recursive algorithm to perform the route calculation.

The device also comprises:

a protection route determination unit 703 configured to, after the route is selected as a working route and when the working route is determined to need a protection route, notify the routing control unit 701 to calculate a route, and for each node on the route, determine whether link attribute information of the node meets the predetermined constraint condition, if the predetermined constraint condition is met, select the route as the protection route to send to a connection controller (CC); if the predetermined constraint condition is not met, notify the routing control unit 701 to calculate another route, and make the determination for the route; wherein the meeting the predetermined constraint condition means that the node has connectivity and wavelength resource information of the node indicates that the node is able to transmit the optical signal with the preset wavelength.

The device further comprises:

an optical path impairment validation module connected to the working route determination unit 702 and the protection route determination unit 703 and configured to, when the working route determination unit 702 or the protection route determination unit 703 determines that link attribute information of each node on a route meets the predetermined constraint condition, perform optical path impairment validation on an optical fiber between the node and its adjacent node on the route, and when the route is determined to be used as the working route or protection route, notify the working route determination unit 702 or the protection route determination unit 703 to select the route as the working route or the protection route.

In the processing of the optical path IV, for example, it is determined whether the cumulative value of loss due to optical path impairment of all optical fibers and nodes on the route is less than a preset value.

Specifically, the optical fiber type, wavelength, optical transmitter and receiver, optical wave converged device and optical wave separator may be detected and validated and specific parameters may be one or more of: a. CD, b. OSNR, c. power, and d. PMD.

The location of the optical path impairment validation module might vary, for example, it might also be embedded in the working route judgment unit 702.

The embodiments of the present invention have the following beneficial effects: after a route that meets the predetermined constraint condition is calculated, whether the route meets the wavelength assignment is determined, instead of performing the wavelength assignment at one time after a plurality of routes are calculated, thus increasing the hit rate of the available routes, reducing information exchange between unit modules, and improving the stability of the system. Moreover, when the embodiments of the present invention is applied in the resistive optical network having the wavelength conversion function, when the wavelength resource information in the link attribute information of each node on the route is determined not to meet the predetermined constraint condition, it can be further determined whether the wavelength conversion capability can meet the predetermined constraint condition.

It should be noted that the above embodiments are only intended to illustrate rather than limit the technical scheme of the present invention, and values of all parameters can be adjusted according to actual situations and should be covered in the protection scope of the claims. It is should be understood by those skilled in the art that the technical scheme of the present invention can be modified or equivalently substituted without departing from the spirit and scope of the technical scheme of the present invention. These modifications and substitutions should be covered in the scope of the claims of the present invention.

INDUSTRIAL APPLICABILITY

The present invention provides a method and device for routing and wavelength assignment in an optical network such that after a route that meets the predetermined constraint condition is calculated, whether the route meets the wavelength assignment is determined, instead of performing the wavelength assignment at one time after a plurality of routes are calculated, thus increasing the hit rate of the available routes, reducing information exchange between unit modules, and improving the stability of the system.

What is claimed is:

1. A method for routing and wavelength assignment in an optical network comprising:
    a topology step, executed by a device for routing and wavelength assignment in the optical network, in which a topology network of the optical network is obtained;
    a route calculation step, executed by the device for routing and wavelength assignment in the optical network, in which only one route in the topology network is calculated by using a route calculation algorithm, a first node and a last node of the route being predetermined, and the one route being one of all routes from the first node to the last node; and
    a wavelength assignment determination step following the calculation of the one route in the route calculation step, executed by the device for routing and wavelength assignment in the optical network, in which for each node on the route, it is determined whether link attribute information of the node meets a predetermined constraint condition that is for determining whether the route meets a wavelength assignment determination condition, when the predetermined constraint condition is met, the route is selected as a working route and a wavelength assignment is performed for the route, and no route other than the one route from the first node to the last node is calculated if a protection route is not further required;
    when the predetermined constraint condition is not met, returns to the route calculation step to calculate a next route from the first node to the last node;
    wherein, after each route that meets the predetermined constraint condition is calculated in the rout calculation step, the wavelength assignment determination step is performed for the route, instead of performing the wavelength assignment at one time after a plurality of routes are calculated.

2. The method according to claim 1, wherein
the first node supports insertion of an optical signal with a preset wavelength into an optical fiber at the first node; and the last node supports removal of the optical signal with the preset wavelength from an optical fiber at the last node.

3. The method according to claim 1, wherein the wavelength assignment determination step further comprises: when the link attribute information of the node is determined to meet the predetermined constraint condition, converting an wavelength of an optical signal into the preset wavelength to meet the predetermined constraint condition;

wherein the meeting the predetermined constraint condition comprises: the node has connectivity and is able to transmit the optical signal with the preset wavelength.

4. The method according to claim 3, wherein the wavelength assignment determination step further comprises:
    when the link attribute information of the node is determined to meet the predetermined constraint condition, performing optical path impairment validation on an optical fiber between the node and its adjacent node on the route.

5. The method according to claim 1, wherein the wavelength assignment determination step further comprises: after the route is selected as the working route, when the working route is determined to need a protection route, returning to the route calculation step to calculate a route; and
    for each node on the route, determining whether link attribute information of the node meets the predetermined constraint condition, if the predetermined constraint condition is met, selecting the route as the protection route, if the predetermined constraint condition is not met, returning to the route calculation step to calculate a next route,
    wherein the meeting the predetermined constraint condition comprises: the node has connectivity and is able to transmit the optical signal with a preset wavelength.

6. The method according to claim 1, wherein in the route calculation step, a recursive algorithm is used to calculate the route.

7. A device for routing and wavelength assignment in an optical network comprising:
    a routing control unit configured to obtain a topology network of the optical network, and perform a route calculation step in which only one route in the topology network is calculated by using a route calculation algorithm, a first node and a last node of the route being predetermined, and the one route being one of all routes from the first node to the last node; and
    a working route determination unit configured to, following the calculation of the one route by the routing control unit, for each node on the route, determine whether link attribute information of the node meets a predetermined constraint condition that is for determining whether the route meets a wavelength assignment determination condition, and when the predetermined constraint condition is met, select the route as a working route and perform a wavelength assignment for the route, wherein no route other than the one route from the first node to the last node is calculated if a protection route is not further required; when the predetermined constraint condition is not met, the routing control unit performs the route calculation step to calculate a next route from the first node to the last node, and working route determination unit continues to make the determination for the next route calculated by the routing control unit;
    wherein, after each route that meets the predetermined constraint condition is calculated in the rout calculation step, the working route determination unit performs the wavelength assignment determination for the route, instead of performing the wavelength assignment at one time after a plurality of routes are calculated.

8. The device according to claim 7, wherein the routing control unit further comprises:
    a first and last node determination module configured to determine whether the first node supports insertion of an optical signal with a preset wavelength into an optical fiber at the first node, and determine whether the last node supports removal of the optical signal with the preset wavelength from an optical fiber at the last node.

9. The device according to claim 7, wherein the routing control unit further comprises:
   a wavelength conversion determination module configured to, when determining that the link attribute information of the node meets the predetermined constraint condition, convert a wavelength of an optical signal into the preset wavelength to meet the predetermined constraint condition; and
   an algorithm selection module configured to select a recursive algorithm to perform the route calculation.

10. The device according to claim 7, further comprising:
   a protection route determination unit configured to, after the route is selected as a working route and when the working route is determined to need a protection route, notify the routing control unit to calculate a route, and for each node on the route, determine whether link attribute information of the node meets the predetermined constraint condition, if the predetermined constraint condition is met, select the route as the protection route to send to a connection controller; if the predetermined constraint condition is not met, notify the routing control unit to calculate a next route, and make the determination for the route; and
   an optical path impairment validation module configured to, when the working route determination unit or the protection route determination unit determines that link attribute information of each node on a route meets the predetermined constraint condition, perform optical path impairment validation on an optical fiber between the node and its adjacent node on the route, and when the route is determined to be used as the working route or protection route, notify the working route determination unit or the protection route determination unit to select the route as the working route or the protection route;
   wherein the meeting the predetermined constraint condition comprises: the node has connectivity and is able to transmit an optical signal with a preset wavelength.

* * * * *